United States Patent [19]

Brand et al.

[11] Patent Number: 4,672,487

[45] Date of Patent: Jun. 9, 1987

[54] MAGNETIC DISK MEMORY HAVING A DISK PACK HUB SEATED AT BOTH SIDES OF A DISK PACK

[75] Inventors: Wilhelm Brand, Rosenheim; Albert Dierkes, Planegg; Otto Olbrich, Taufkirchen, all of Fed. Rep. of Germany

[73] Assignee: Siemens Aktiengesellschaft, Berlin and Munich, Fed. Rep. of Germany

[21] Appl. No.: 696,205

[22] Filed: Jan. 29, 1985

[30] Foreign Application Priority Data

Feb. 7, 1984 [DE] Fed. Rep. of Germany ....... 3404251

[51] Int. Cl.⁴ ............................................. G11B 5/012
[52] U.S. Cl. ........................................ 360/97; 360/98
[58] Field of Search ................................... 360/97-99, 360/86

[56] References Cited

U.S. PATENT DOCUMENTS

| | | | |
|---|---|---|---|
| 3,047,869 | 7/1962 | Marcum et al. | 360/98 |
| 3,593,332 | 7/1971 | Strehl et al. | 360/97 |
| 4,092,687 | 5/1978 | Butsch | 360/97 |
| 4,150,406 | 4/1979 | Stollorz | 360/97 |
| 4,216,512 | 8/1980 | Vidwans | 360/97 |
| 4,249,221 | 2/1981 | Cox et al. | 360/97 |
| 4,519,010 | 5/1985 | Elsaesser et al. | 360/97 |

Primary Examiner—John H. Wolff
Assistant Examiner—Matthew J. Bussan
Attorney, Agent, or Firm—Hill, Van Santen, Steadman & Simpson

[57] ABSTRACT

In a magnetic disk memory comprising a disk pack hub seated at both sides in ball bearings in a housing, the ball bearings are tensed in the actual direction relative to one another in order to achieve a play-free hub guidance. To this end, at least one housing wall is resiliently designed in the direction of the hub axis and flexes upon the application of a restraining force. Before integration into a completed memory unit, the spacings of the inner rings of the ball bearings, tightly seated on the hub shaft, and of the bearing locations in the housing which accept the outer rings with an interference fit, deviate slightly from one another.

11 Claims, 3 Drawing Figures

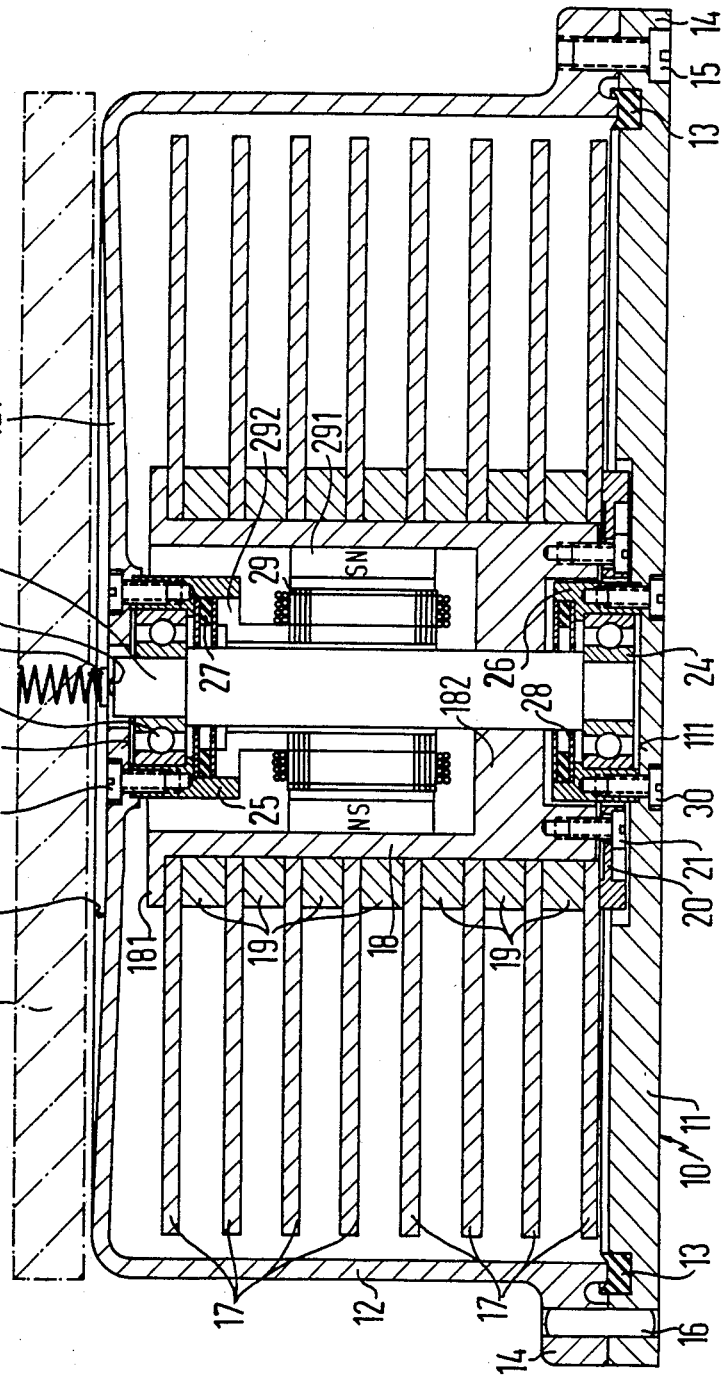

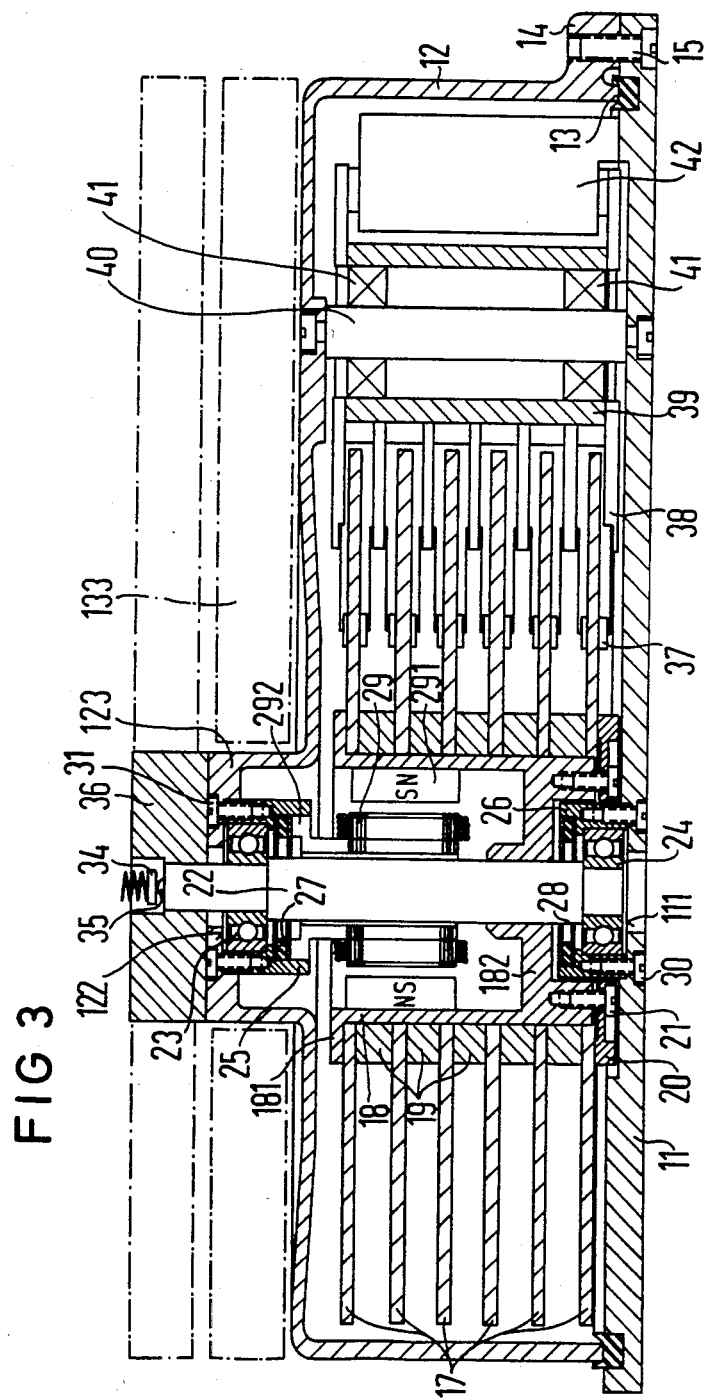

MAGNETIC DISK MEMORY HAVING A DISK PACK HUB SEATED AT BOTH SIDES OF A DISK PACK

BACKGROUND OF THE INVENTION

1. Field of the Invention

The present invention relates to a magnetic disk memory which has a hub seated at both sides of a magnetic disk with the assistance of a shaft, carrying at least one storage disk and driven by a motor, whereby a pair of ball bearings is provided for bearing the hub in mutually opposite walls of a housing, the ball bearings being restrained in the axial direction relative to one another in order to achieve a play-free hub guidance.

2. Description of the Prior Art

A distinction is generally made in magnetic disk memories between memories having fixed disk packs and exchangeable disk packs. Technical development is continuing to proceed in the direction of higher and higher storage capacities, both in view of the track density and the bit density as the characteristic for the storage capacity per disk surface, on the one hand, and in view of the mechanical structure in order to be able to accommodate as many magnetic disks as possible in a prescribed mounting space. An example of this is the so-called 5¼" fixed disk memory whose magnetic disks have an outer diameter of 130 mm and an inside diameter of 40 mm according to, for example, the German industrial standard. Analogous to the dimensions of competing flopping disk drives, a mounting space having a mounting height of 82.5 mm and a base area of 146 mm × 203 mm has crystallized out of this type of storage as a uniform size which is available for the overall apparatus including a housing and the appertaining electronics.

The desire to accommodate as many magnetic disks as possible in this prescribed mounting space is subordinate to the developmental goal of higher storage capacities and to the efforts to increase the recording density on the magnetic disks. Within the scope of this structural endeavor, embodiments of 5¼" fixed disk memories have been disclosed wherein the drive motor for the disk pack has been miniaturized to such a degree and has been structurally designed such that it can still be built into the hub of the disk pack, even given a prescribed inner diameter of 40 mm for the disk packs. An element which has a significant co-determining effect on the overall height of conventional fixed disk memories is therefore integrated in the hub of the magnetic disk pack and the overall height exploitable for the disk stack is therefore expanded. Based on current considerations in the size of the combined magnetic heads and of the disk thickness, disk packs which contain up to eight magnetic disks stacked on top of one another have therefore become possible. The remaining overall height is required for the housing and the drive electronics.

As mentioned above, the recording density on the magnetic disk is the product of the write density times the track density. A significant criterion for the structural format of a magnetic disk memory also occurs for the case of the present invention, specifically from the track density having, for example, more than 1000 tracks/inch. This high track density requires the best possible vibration-isolated seating of the spindle of the disk pack in the housing. Requirements are therefore made for this type of storage such as heretofore played a part only with respect to large and expensive disk memories, for example the 14" disk memories.

For such high capacity disk memories having a larger diameter, it is generally known to seat the spindle of the disk pack at one side in a heavy base plate, in part in structures designed in a very involved manner, this particularly applying to conventional memories having exchangeable disk packs, i.e. memory designs which allow for removing the disk pack from the magnetic storage device. On the other hand, structures are also known wherein the spindle is seated at both sides in a rigid housing surrounding the pack. In order to achieve as vibration-isolated a spindle seating as possible, a fixed bearing and a movable bearing are employed given this two-sided seating and a spring is provided adjacent the movable bearing, the spring tensing the two bearings relative to one another after assembly such that a coaxial spindle guiding that is as free of play as possible is achieved. However, this goal can only be achieved to an extent limited by the inherent characteristics of such a combination of fixed and movable bearings. Further, additional mounting space is required for the incorporation of the spring, this therefore being lost as useable storage space on the one hand, and taking away valuable space when the motor is built into the hub, on the other hand.

SUMMARY OF THE INVENTION

It is therefore a main object of the present invention to provide a magnetic disk memory having two-sided bearing of the hub in the housing which is designed in a space saving manner and, under given conditions, allows the incorporation of a drive motor in the hub of the disk pack and is nonetheless structurally simple in order to avoid excessive manufacturing expenses which are not justifiable given the constantly decreasing ratio of price/storage capacity.

With reference to a magnetic disk memory of the type initially mentioned, the above object is achieved according to the present invention in that at least one of the housing walls is designed to be resiliently yielding in the direction of the hub axis in response to the application of a restraining force, being thus designed in the region of the corresponding bearing location for the hub and the inner rings of the ball bearings being fixed on the hub shaft with an interference fit at a spacing which deviates slightly from the corresponding spacing of the bearing locations for the later seating of fixed outer rings of the ball bearings in the housing walls, so that the outer rings are displaceable in the axial direction relative to the inner rings after the hub has been mounted in the housing, being therefore displaced upon exploitation of the spring effect of the resilient part of the housing wall.

The aforementioned solution is particularly distinguished in that an unequivocally play-free spindle bearing is now achieved with the assistance of two fixed bearings instead of a standard combination of a movable bearing and a fixed bearing, so that the play that is always unavoidable given a movable bearing is eliminated. Further, the housing of the disk memory is designed such that a separate tensing element is not required and, above all, the part of the mounting space thereby gained can therefore be added to the useable overall height.

BRIEF DESCRIPTION OF THE DRAWINGS

Other objects, features and advantages of the invention, its organization, construction and operation will be best understood from the following detailed description, taken in conjunction with the accompanying drawings, in which:

FIG. 2 is a sectional view taken along the parting line II—II of FIG. 1 and showing the details of a spindle bearing; and FIG. 3 is a sectional view of the magnetic disk memory of FIG. 1 taken substantially along the parting line III—III of FIG. 1.

DESCRIPTION OF THE PREFERRED EMBODIMENTS

Figure 1:
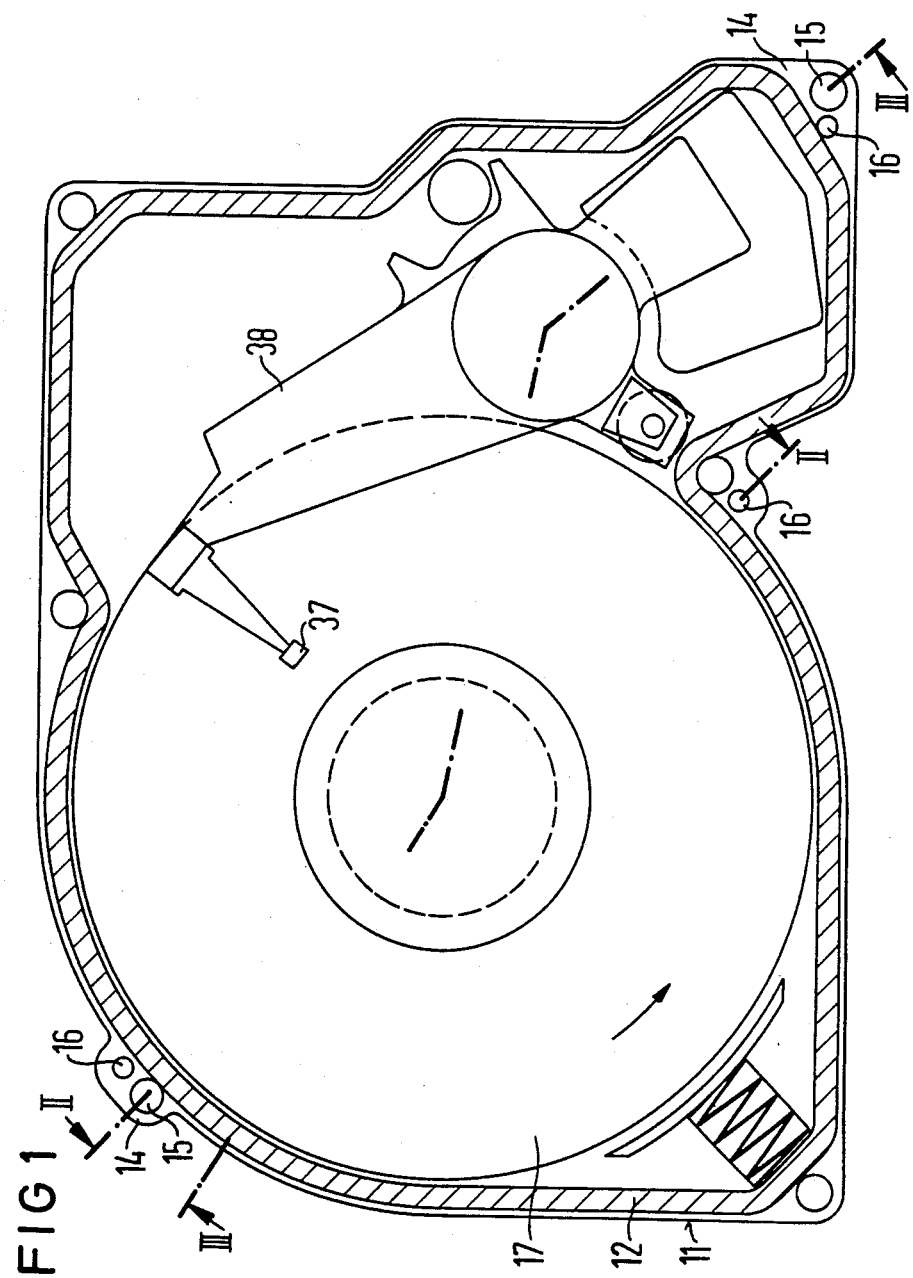
FIG. 1 is, in general, a plan view of the structure of a magnetic disk memory designed in accordance with the present invention.

FIGS. 1 and 2 illustrate a housing 10 which comprises a planar base plate 11 and a cover 12 which are designed in the manner of a pot. The cover is seated on all sides on a soft seal 13 which is let into a peripheral groove of the base plate 11. The cover 12 comprises fastening eyes 14 having threaded bores that project laterally from the side walls of the cover, fastening screws 15 for fixing the cover 12 to the base plate 11 being screwed into the fastening eyes from below through corresponding bores in the base plate 11. The cover is thereby allocated to the base plate 11 with an accurate fit at at least two places via set pins 16.

The magnetic disk pack having a plurality of magnetic disks 17 which are fixed on a hub 18 is disposed within the interior region of the disk memory surrounded by the housing. Given 5¼" fixed disk memories, up to eight magnetic disk 17 can be accommodated in the mounting space prescribed by the overall height standard. At one end, the hub 18 comprises a collar 181 against which the uppermost of the magnetic disks 17 lies in abutment therewith. The magnetic disks 17 are catenated on the hub 18 via intermediate rings 19. At that end of the hub 18 facing away from the collar 181, a tension ring 20 is fixed with screws 21 such that it connects the entire magnetic disk pack to the hub 18 with a now-positive lock.

The hub 18, itself, is designed as a hollow member that is fixed with a non-positive lock to a spindle 22 having a center web 182. The hub 18 and the spindle 22 therefore form a structural unit which can also be manufactured as a one-piece structure under given conditions. The two ends of the spindle 22 are designed as axle stubs which respectively carry a ball bearing 23 or, 24. The inner rings of these ball bearings are seated on the corresponding axle stubs with an interference fit. The outer rings of the ball bearings 23 and 24 are thereby firmly seated in bearing bushes 25 or, respectively 26. The interference fit of the inner rings and of the outer rings of the ball bearings 23, 24 can be achieved with conventional means, for example by way of bonding or by way of a medium-force fit.

Given selection of a press fit, however, the seating tolerances must be selected such that a part of the bearing clearance still remains for the later tensing of the ball bearings.

The interior region of a disk memory should have an extremely clean atmosphere so that no disturbances due to the settling of dust particles on the surfaces of the magnetic disks 17 can occur during operation of the disk memory. The ball bearings 23, 24 are therefore sealed from the interior via commercially-available magnetic fluid seals 27, 28 which are disposed at the inwardly-residing end of the bearing bushings 25, 26.

FIG. 2, finally, illustrates that a drive motor 29 is disposed in the cavity of the hub 18 in a manner known per se, the drive motor 29 therefore being only schematically indicated on the drawing. Depending on the motor principle, the rotor 291 is fixed at the revolving hub 18 or at the revolving spindle 22, whereas the stator 292 is secured to the stationary bearing bush 25. The power supply to the motor 29 occurs only to its stator 292 via cable leads that are not shown. These leads are conducted through an opening between the inner surface of the hub 18 and the exterior surface of the bushing 25.

The described structure of the disk pack comprising the magnetic disks 17, the hub 18, the spindle 22, the drive motor 29 and the assembled ball bearings 23, 24 with the bearing bushing 25 or, respectively, 26 fixed thereto can already be balanced before being actually built into the housing 10, being therefore balanced in a correspondingly-designed apparatus which accepts the bearing bushings 25, 26 and is therefore functionally equivalent to the housing 10. Simultaneously with the balancing, a servo information for track and/or sector selection required for the later write/read operation of the magnetic disk memory can also be written in.

Subsequently the disk pack produced as a module is mounted in the housing 10. To this end, the inwardly-directed face of the base plate 11 comprises a recess centrally aligned with respect to the axis of the spindle 22 and having an acceptance surface 111. The outwardly-residing end of the bearing bushing 26 is inserted into this recess and is fixed to the base plate 11 with the assistance of fastening screws 30. The cover 12 is then inverted over the disc pack and is secured to the base plate with the housing screws 15.

It should be pointed out that the mutually-assigned sub-surfaces of the cover 12 and of the base plate 11 in the region of the fastening bosses are worked in order to achieve an unequivocal seal between the cover and the base plate and a narrowly-tolerated mounting dimension as well. The working of the seating surfaces in the region of the fastening eyes or bosses at the base plate and cover and the working of the seating surfaces 111 and 122 for the bearing bushings 25 and 26 can occur in one chucking operation. A high parallelism of the seating surfaces and, together with the accurately fabricated bearing bushings, provide a very accurate rectangular assembly attitude of the ball bearings 23 and 24 relative to the axis. This is an essential prerequisite for the high-precision revolution of the spindle 22 that is required. When the cover is put in place, the outwardly-directed end of the bearing bushing 25 is fixed at the inside of a cover plate 121 of the cover 12. Analogous to the base plate 11, this cover plate 121 likewise comprises a central recess having an inwardly-directed seating surface 122. This central recess in the cover plate 121 accepts the outer end of the bearing bushing 25 which is fixed to the interior face of the cover plate with further fastening screws 31.

It is important for the structural format of the spindle seating arrangement that the cover face 121 of the cover 12 forms a planar surface in its non-integrated condition, i.e. when the base plate 11 and cover 12 are screwed together without a disk pack, the spacing between the seating surface 111 and the seating surface 122 is larger by a slight amount than the corresponding spacing between the outer ends of the bearing bushings 25 and 26 of an assembled disk pack which, however, has not yet been built into the housing. Given the described integration of a disk pack into the housing 1, the two bearings bushings 25, 26 are axially pulled apart due to the restraining force exerted by the fastening screws 30 and 31. The cover plate 121 of the cover 12 thereby arcs inwardly by the deflection path 32 (shown exaggerated for reasons of clarity) and therefore grips the ball bearings 23, 24 in the axial direction.

An axial restraint of bearings for achieving a low bearing play is known per se. Normally, however, a combination of a fixed bearing and a movable bearing is employed to that end, whereby an axially-acting spring assigned to the movable bearing presses against the displaceable ring of the movable bearing. Such a spring coaxially disposed on the corresponding spindle, however, requires space and a remaining bearing play, however slight, of the movable bearing is structurally unavoidable. Given the described bearing structure, however, the cover plate 121 of the cover 12 assumes the spring function. The thickness of the cover plate 121 is thereby dimensioned such that the restraining force to be allocated to the ball bearings 23, 24 is achieved with low tolerance with a defined force determined by the difference between the above-described spacing of the bearing locations. A significant advantage of this bearing structure is that the useable mounting height is increased by the elimination of a separate spring acting in the axial direction. This is of increased significance particularly in combination with the space-saving structure of a drive motor integrated in the hub 18 itself. Moreover, given the described bearing restraint, both ball bearings having interference fit at the inside ring and at the outside ring, so that the disk pack no longer exhibits a bearing play in the radial direction that always exists given a conventional bearing restraint. This elimination of the bearing play is of decisive significance, particularly for high recording densities with disk packs having a plurality of magnetic disks 17.

Also schematically illustrated in FIG. 2 is that a space-saving format achieved by the play-free and two-sided bearing of the spindle 22 of the magnetic disk pack also has adequate space for the acceptance of an electronic assembly 33, even given eight magnetic disks. The device electronics implemented with this assembly does not have any functional relationship with the mechanical bearing structure per se, so that a detailed illustration on the drawing and a more detailed description are unnecessary here. Let only one detail be pointed out, however, this explaining a faultless grounding of the magnetic disk pack. The cover 121 of the cover plate 12 comprises a bore concentric to the spindle axis into which the corresponding end of the spindle 22 projects. Extending in the direction of this spindle end, the assembly 33 carries a carbon lamina 34 resiliently secured under spring pressure which is supported against a ball 35 captive in a central recess of the corresponding end of the spindle 22. A faultless grounding of the revolving magnetic disk pack can therefore be achieved under the precondition that the resilient connection of the carbon lamina 34 to the electronic assembly is unequivocally grounded. The only thing involved in this is producing a clean ground connection between the carbon lamina 34 and the end of the spindle 22, for which reason other embodiments are also conceivable such as, for example, a rounding of the spindle end which thereby produces a cone on which the carbon lamina 34 is supported under spring pressure.

A somewhat modified embodiment of a magnetic disk pack is illustrated in FIG. 3, whereby the structural format of the bearing of the spindle 22 is, however, basically the same. In contrast to the embodiment discussed above, however, this embodiment proceeds on the basis that a mechanical brake 36 is flanged to the spindle 22 extending through the cover plate 121 of the housing 1, the mechanical brake 36 serving in a known manner to decelerate the magnetic disks as quickly as possible when the disk memory is shut off. Such a mechanical brake is known per se in the context of magnetic disk memories and often represents an accessory which may be purchased off the shelf. The structure of the brake is therefore not shown in detail and a specific description of the brake can also be omitted here. It is merely pointed out that the required mounting space for the mechanical brake 36 requires a corresponding opening in the electronic assembly 33. It is likewise assumed that a further electronic assembly 133 is provided in addition to the electronic assembly 33. The mounting space for the magnetic disk pack is therefore reduced, so that fewer disks 17 are united in the disk pack in this illustrative embodiment. Since, however, the structural length of the motor cannot be reduced to the same degree as a result of the lower number of magnetic discks, a collar 123 is provided in the cover plate 121 and projects upwardly toward the brake 36 and forms a space for one of the bearing locations for the spindle 32, here the bearing 23, in a manner analogous to the previously-discussed embodiment. The device electronics 133 can then be disposed around this collar. The bearing of the spindle 22 in the housing corresponds exactly to the type of bearing described above, mutually corresponding part of the two embodiments being provided with identical reference characters and a further detailed description thereof is omitted in order to avoid unnecessary repetition.

In order to complete the description, however, this second embodiment of a magnetic disk memory constructed in accordance with the invention and illustrated in FIG. 3 shows a positioning device for magnetic heads which are set to corresponding tracks of the magnetic discks 17 at the beginning of a write or read operation. Here each magnetic disk 17 has a pair of magnetic heads 37 assigned thereto, these magnetic heads 37 flying above the assigned magnetic disk surface at a slight distance during normal operation. The magnetic heads are secured to pivot arms 38 which, fixed in common to a positioning hub 39, pivot around a positioning shaft 40 and, therefore, can sweep the entire surface of the assigned magnetic disks 17. To this end, the positioning hub 39 is seated on the positioning shaft 40 via schematically-illustrated ball bearings 41. This shaft is gripped by further fastening screws between the base plate 11 and the cover 12 of the housing, whereby the resiliency of the cover 12 is also exploited. A play-free bearing of this shaft as well can also be achieved in an analogous manner by restraining the ball bearings 41, for example by way of spacers (not shown). The fact that the positioning shaft 40, just like the spindle 22, is secured between the base plate 11 and the cover 12 yields an accurate assignment of the pivot arms 38 to the center of the disks from one magnetic disk 17 to the next in a simple manner.

For the sake of completeness, it should be pointed out that a linear positioner, given which the magnetic heads 37 reciprocate on a straight line relative to the spindle axis, can also be utilized instead of the rotational positioner.

The setting motion of the magnetic heads 37 or, respectively, of the pivot arms 38 is effected by way of a schematically-indicated positioning motor 42. Such positioning motors are known per se in conjunction with rotational positioning devices for magnetic disk memories; given these, either a coil is moved in a constant magnetic field or a magnet is subjected to excursion over a stationary coil, whereby the momentary value of the current flowing through the coil is a measure for the rotational acceleration of the rotational positioner in both cases.

Given both described illustrative embodiments of the invention, the side wall of the cover 12 is circumferentially closed. The cover is therefore very resistant per se to a parallel dislocation relative to the base plate 11 and is only deformable in the described cover plate in the vertical direction, i.e. in the direction of the spindles of the magnetic disk pack and of the rotational positioner. This stiffness causes the resonant frequency of the spindle and of the positioner shaft to be increased so high and, therefore, the oscillation amplitude so low that, even given extremely high track densities, the controlling device which, together with the positioner motor, allows the magnetic heads to follow the tracks concentrically recorded on the disks is no longer disturbed.

In this context, it is also conceivable within the scope of the invention to design the cover plate 121 such that it is resiliently deformable essentially only in the region of the bearing locations and/or that the base plate 11 is also resiliently designed in the region of these bearing locations so that the restraining forces are distributed to both parts of the housing, the cover 12 and the base plate 11. In addition to this, the described housing structure offers the further possibility that the acceptance location for the bearings of the spindle and of the positioner shaft in the base plate 11 and the cover 12 can respectively be worked with the same dimensional accuracy, this occurring, for example, upon exploitation of the set pins in a respective chucking operation so that an accurate assignment of the magnetic heads to the corresponding magnetic disks is therewith guaranteed.

In the two illustrative embodiments described above, the plane of section between the two housing parts is identical to the circumferential lateral edge of the housing cover 12. However, it is known per se to also place this plane of section such that both bearing locations of the spindle 22 lie in common in one and the same housing part, i.e. that the plane of section does not, as described, lie at right angles, but parallel to the axis of the spindle 22. That is particularly advantageous because the concentricity of the two bearing locations can therefore be accurately achieved with simple means during the fabrication of the housing.

It is also conceivable to modify the housing structure in the indicated manner with the provision that at least one housing wall is now preferably intentionally resiliently designed only in the region of the appertaining bearing location. The position of the plane of section is therefore not of decisive significance for the desired function and it remains open in the individual applied case whether the one or the other position is given preference based on other considerations.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. A magnetic disk memory comprising:
   a housing comprising first and second opposite walls, said first wall being yieldably resilient, said first and second walls spaced apart a predetermined distance in an unstressed condition of said first wall;
   a spindle including first and second ends, at least one magnetic disk, mounting means mounting said at least one magnetic disk about said spindle and a drive motor about said spindle drivingly coupling said spindle and said mounting means;
   first and second bearings mounted on said spindle at said first and second ends, respectively, and each of said first and second bearings including an inner ring mounted on a respective end of said spindle and an outer ring including an end with an end surface facing a respective one of said walls, said end surfaces spaced apart less than said predetermined distance; and
   securing means for securing said ends of said outer rings of said bearings to said first and second walls and applying tension to said outer rings to cause said first wall to yieldably deform and secure said bearings free of play in the axial direction of said spindle.

2. The magnetic disk memory of claim 1, wherein:
   both of said first and second walls are yieldably resilient in the area of their bearing securement so that the retaining force is equally distributed to both of said walls.

3. The magnetic disk memory of claim 1, wherein said securing means comprises:
   first and second bearing bushings embracing respective ones of said outer rings, and respective fasteners connecting said bearing bushings to said first and second walls.

4. The magnetic disk memory of claim 3, wherein:
   said first and second walls comprise first bores in the area of said bearing bushings;
   said bearing bushings comprise threaded second bores aligned with said first bores; and
   said fasteners comprise screws extending through said first bores and threadedly engaging said second bores.

5. The magnetic disk memory of claim 1, and further comprising:
   first and second magnetic fluid seals each mounted adjacent a respective bearing on the side thereof facing and sealing said bearing from the inside of said disk housing.

6. The magnetic disk memory of claim 1, wherein:
   said second wall is a base plate for supporting said memory; and
   a cup-shaped cover is connected to said second wall and comprises said first wall and includes a stiff side wall extending parallel to the axis of said spindle.

7. The magnetic disk memory of claim 6, wherein:
   said second wall includes a peripheral groove aligned with said stiff sidewall of said cup-shaped cover;
   a sealing ring is mounted in said groove; and screws connect said base plate with said cover and cause deformation of said sealing ring by said sidewall.

8. The magnetic disk memory of claim 1, and further comprising:
a rotational positioner including a shaft between and connected to said first and second walls, at least one pivot arm about and pivotal with respect to said shaft, and a magnetic head carried by at least one pivot arm adjacent said at least one magnetic disk.

9. The magnetic disk memory of claim 8, wherein:
said shaft has a length slightly less than said predetermined distance, and further comprising attachment means connecting the ends of said shaft flush against said first and second walls free of play in the axial direction of said shaft.

10. The magnetic disk memory of claim 1, wherein:
said mounting means comprises a hollow hub and said drive motor is disposed within said hub; and
a plurality of said magnetic disks, spaced apart, is carried on said hub,
said drive motor including a stator connected to a first bearing bushing and a rotor connected to said hub.

11. The magnetic disk memory of claim 1, and further comprising:
mounting means including a projection extending from said first end of said spindle;
an aperture in said first wall receiving said projection; and
spring-loaded conductive means bearing on said projection and serving as a ground connection.

* * * * *